United States Patent
Thakkar et al.

(10) Patent No.: US 8,132,056 B2
(45) Date of Patent: Mar. 6, 2012

(54) DYNAMIC FUNCTIONAL TESTING COVERAGE BASED ON FAILURE DEPENDENCY GRAPH

(75) Inventors: Rajesh P. Thakkar, Bangalore (IN); John Kurian, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 566 days.

(21) Appl. No.: 12/039,190

(22) Filed: Feb. 28, 2008

(65) Prior Publication Data
US 2009/0222697 A1     Sep. 3, 2009

(51) Int. Cl.
*G06F 11/00*     (2006.01)

(52) U.S. Cl. .................................................. 714/38.1

(58) Field of Classification Search ............. 714/38, 714/25, 27, 38.1
See application file for complete search history.

(56) References Cited

U.S. PATENT DOCUMENTS

| | | | |
|---|---|---|---|
| 5,297,150 | A | 3/1994 | Clark |
| 2004/0088677 | A1 | 5/2004 | Williams |
| 2005/0132253 | A1 | 6/2005 | Gail et al. |
| 2005/0223361 | A1 | 10/2005 | Belbute |
| 2006/0070048 | A1 | 3/2006 | Li et al. |
| 2007/0061625 | A1 | 3/2007 | Acosta, Jr. et al. |
| 2007/0220370 | A1 | 9/2007 | Branda et al. |
| 2008/0256392 | A1* | 10/2008 | Garland et al. ........... 714/33 |

OTHER PUBLICATIONS

Barr, "Applications of Rule-Base Coverage Measures to Expert System Evaluation", Department of Computer Science, Hofstra University; pp. 1-21, Jun. 12, 1998.
Leon, et al., "An Empirical Evaluation of Test Case Filtering Techniques Based on Exercising Complex Information Flows", ICSE '05; pp. 412-421, May 15-21, 2005.
Candea, et al., "Automatic Failure-Path Inference: A Generic Introspection Technique for Internet Applications", Proceedings of the 3rd IEEE Workshop on Internet Applications (WIAPP); pp. 1-10, Jun. 2003.
Helmstetter, et al., "Test Coverage for Loose Timing Annotations", STMicroelectronics, HPC, System Platform Group.
Gregoriades, et al., "Scenario-Based Assessment of Nonfunctional Requirements", IEEE Transactions on Software Engineering; vol. 31, No. 8, pp. 392-409, May 2005.
Tsai, et al., "Scenario-Based Functional Regression Testing", 2001 IEEE; pp. 496-501, 2001.
Willmor, et al., "Exploring Test Adequacy for Database Systems", Informatics Process Group, School of Computer Science, University of Manchester; pp. 1-11.

(Continued)

*Primary Examiner* — Scott Baderman
*Assistant Examiner* — Yair Leibovich
(74) *Attorney, Agent, or Firm* — Scully, Scott, Murphy & Presser, P.C.; Daniel McIoughlin

(57) ABSTRACT

A method, system and computer program product is disclosed for providing test coverage for detecting failures in a software application. The method comprises the steps of identifying a set of test cases; and for each of at least a subset of said test cases, identifying one or more of the other test cases that depend on said each of the test cases based on a defined functional relationship. The method comprises the further steps of using a selected one of said subset of test cases to test the software application; and when said test of the software application fails, then testing the software application with the one or more of the other test cases that depend on said selected one of the test cases based on said functional relationship.

20 Claims, 3 Drawing Sheets

OTHER PUBLICATIONS

Gokhale, et al., "Dynamic Code Coverage Metrics: a Lognormal Perspective", 11th IEEE International Software Metrics Symposium (METRICS 2005), 1530-1435, 2005; and.

Russell R. Hurlbut, "A Survey of Approaches for Describing and Formalizing Use Cases", Document: XPT-TR-97-03, pp. 1-40, http://www.iit.edu/~rhurlbut/xpt-tr-97-03.html.

* cited by examiner

DYNAMIC FUNCTIONAL TESTING COVERAGE BASED ON FAILURE DEPENDENCY GRAPH

BACKGROUND OF THE INVENTION

1. Field of the Invention

This invention generally relates to software testing, and more specifically, to methods and systems for selecting test cases for testing software applications. Even more specifically, the preferred embodiment of the invention relates to such methods and systems that provide dynamic functional testing coverage based on Failure Dependency Graphs (FDGs).

2. Background Art

When testing software systems, developing an effective and efficient test suite is a complex problem. A suite is effective if it thoroughly covers combinations of inputs, actions, and sequences of actions, enhancing the likeliness it will encounter defects in the software. A suite is efficient if it provides such coverage without unnecessary redundancy, which would unduly increase the testing effort.

Typically, when a tester tests a software system, the tester or test program takes an action against the system being tested and receives a result or response back from the tested system. The received result is compared against an expected result to determine if the system is working correctly. The tester performs a series of these action/response sequences. Sometimes, the order of this sequence depends upon the responses which were received earlier in the sequence. The number of ways that the sequences may be combined is very large.

Also, for most actions where the tester stimulates the system in a step in the sequence, the number of potential inputs to that particular action is very large. So, there are at least two places where one runs into a large number of combinations which leads to a combinatorial explosion problem.

Conventionally, focus for test generation has been on techniques such as finite-state based testing, which uses a finite state representation of the system being tested to generate sequences of actions that may be used to test the system. The actions are determined by seeking to cover states, transitions between states, or some combination thereof. These methods suffer from disadvantages of dealing with combinatorial explosion, and are complex to optimize from an internal state-based viewpoint.

Some companies have developed suites of tools that facilitate various types and stages of testing. One such suite is the International Business Machines (IBM®) Rational® Functional Tester (RFT). RFT is an object-oriented automated test tool that allows testing to be preformed on a variety of different application programs. It encompasses several modules that facilitate in the overall testing procedure. It enables testers to generate or use custom test scripts with choices in scripting languages and development environment. RFT contains object technologies that enable record-and-playback functionality for Java™, .Net™, and other applications including web-based applications. It also provides testers with automation capabilities to perform data-driven testing activities.

For example, when a tester writes or records a test script within RFT, the tool generates a test object map for the application under test. This object map is similar to a blueprint which contains object properties. The object map provides flexibility by allowing testers to modify the object map by reusing it, changing it, or by adding more objects as required. Once the object map is established, testers can insert verification points into the script which act to confirm the state of the object across a build process or test process. This is the baseline data file which contains the expected results when the program performs as it should. When a test is completed, a tester can utilize RFT's Verification Point Comparator to analyze differences or update the baseline if the behavior of the object changes.

In addition, Rational® Manual Tester [TM] enables manual test authoring and execution tools while also providing the monitoring for all aspects of manual and automated testing from iteration to iteration. Other tools include the IBM/Tivoli® Identity Manager (ITIM), which is a web-based application for testing applications providing security measures to access, such as log in screens. ITIM addresses a need to test the web interface to check for various conditions such as heavy stress, load situations etc., where manual testing of such user interfaces requires an excessive amount of human data entry and is often impossible to meet the proposed deadline due to time and resource constraints.

Clearly, automation plays a vital role in software testing. With shortened test cycles, reduced resources and increased workloads, testers rely heavily on automation to complete their tasks in timely fashion. With all the variety of testing tools and suites of products available, it is often difficult for testers to implement these tools in an efficient and effective manner.

In most Enterprise Business Applications, there will be a large number of test cases often numbering in tens or even hundreds of thousands. The challenge with these kinds of applications is in deciding which and how many test cases (suite) to run after the daily (periodic) builds. This is because, given the time and hardware constraints, it is impossible to run all the test cases periodically. This scenario requires a solution that provides an optimum test coverage while keeping in mind the resource constraints and hence improving the probability of finding the defects early. The challenge is to defining what an "optimum coverage" would be. Current solutions focus on defining quantity and feature based test coverage. These manual or brute force methods fail to achieve early detection of defects since they are not based on any understanding of the application or the relationships between testcases or features.

SUMMARY OF THE INVENTION

An object of this invention is to improve methods and systems for testing software applications.

A further object of the present invention is to provide methods and systems that improve the early detection of defects in software applications based on a dynamic coverage.

A further object of the invention is to use a given test suite, which is used to test software applications, as a seed, based on which dynamic test coverage of the software application is achieved.

Yet a further object of the preferred embodiment of the invention is to provide optimum testing coverage for a software application, keeping in mind the resource constraints and hence improving the probability of finding the defects early.

These and other objects are attained with a method, system and computer program product for providing test coverage for detecting failures in a software application. The method is for identifying a set of test cases; and for each of at least a subset of said test cases, identifying one or more of the other test cases that depend on said each of the test cases based on a defined functional relationship. The method further addresses using a selected one of said subset of test cases to test the software application; and when said test of the software application fails, then testing the software application with the one or more of the other test cases that depend on said selected one of the test cases based on said functional relationship.

Preferably, identifying one or more of the other test cases that depend on said each of said subset of the test cases includes, for each of the at least one of the subset of test cases, building a dependency graph, starting from said at least one of the test cases, based on said functional relationship, where each of said one or more of the other test cases forms a respective one node on said dependency graph. For example, testing the software application preferably includes traversing the dependency graph that starts from the selected test case to identify said one or more other test cases that depend from said selected test case. Further, preferably, each of the group of test cases is associated with one or more objects; and said defined functional relationship is based on said objects.

The preferred embodiment of the present invention, described in detail below, provides optimum test case execution coverage based on a Failure Dependency Graph (FDG). FDG is built by mining information pertaining to the functional relationship between test cases which is captured by the Functional Test Automation tool. This tool records a test case in the form of a script and a shared object map. In accordance with the present invention, relationships between the test cases from the object map are extracted and Failure Dependency Graphs can be built using these relationships. Nodes in the graph represent test scripts while edges represent a failure dependency relationship. The user (tester) executes a suite of test cases after the build which has been made periodically, for example a daily build. If a test case fails, then based on the FDG, the dependency graph is traversed and all the related test cases are executed. This way, failures of test cases lead to dynamic coverage of additional cases that are related based on functional and failure dependency.

Further benefits and advantages of this invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
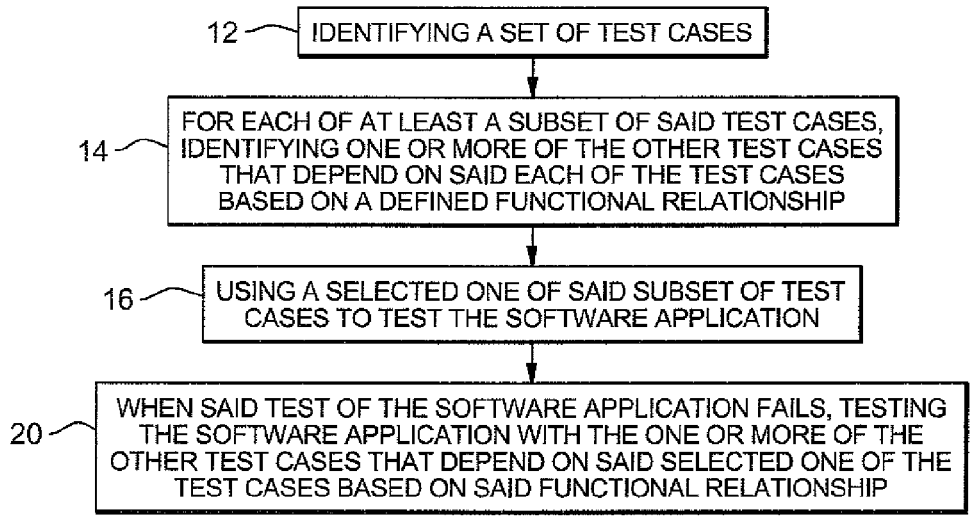
FIG. 1 is a flow chart illustrating a preferred method of practicing the present invention.

The present invention provides a method, a system and a computer program product for providing test coverage for detecting failures in a software application; and the preferred embodiment of the invention dynamically selects test cases, based on a failure dependency graph, for testing a software application. FIG. 1 illustrates a preferred implementation of this invention. In this method, at step 12 a group of test cases are identified and, at step 14, for each of at least a set of said group of test cases, one or more of the other test cases are identified that depend on said each of the test cases based on a defined functional relationship. At step 16 a selected one of said set of test cases is used to test the software application, and at step 20, when said test of the software application fails, the software application is tested with the one or more of the other test cases that depend on said selected one of the test cases based on said functional relationship.

The preferred embodiment of the invention provides optimum test case execution coverage based on a Failure Dependency Graph (FDG). FDG is built by mining information pertaining to the functional relationship between test cases which is captured by the Functional Test Automation tool. This tool records a test case in the form of a script and a shared object map. In accordance with the invention, the relationships between the test cases from the object map are extracted and the Failure Dependency Graph can be built. Nodes in the graph represent test scripts while edges represent failure dependency relationships. The user executes a suite of test cases after the periodic build (daily build). If a test case fails, then based on the FDG, the dependency graph is traversed and all the related test cases are executed. This way, failures of test cases lead to dynamic coverage of additional cases that are related based on functional and failure dependency.

Figure 2:
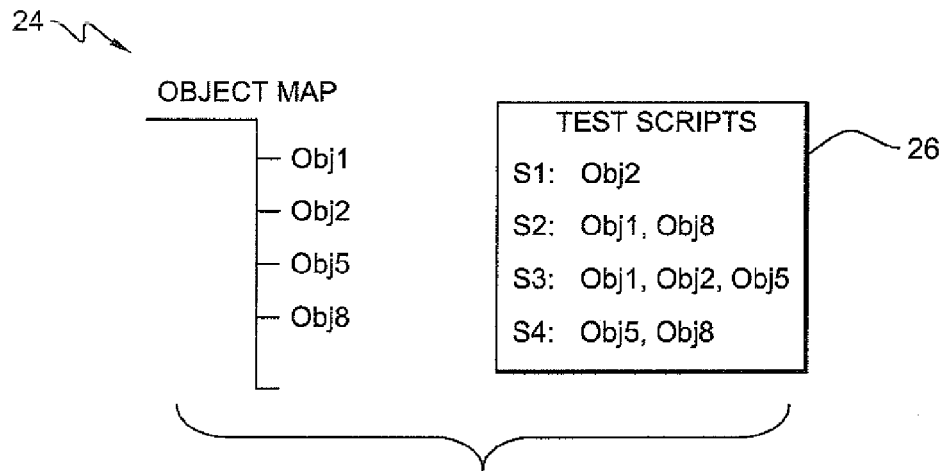
FIG. 2 depicts a shared object map and a table showing which scripts have these shared objects.

More specifically, the functional testing tool has a shared object map which contains objects that are shared between all the scripts that are recorded for a System Under Test (SUT). Hence, for a SUT, test scripts that use shared objects indicate a functional relationship between these scripts. As an example, FIG. 2 shows an object map 24 with four objects and four scripts that share these objects. In this example, as indicated in table 26, test scripts S1 and S3 share object Obj2, and test scripts S2 and S3 share object Obj1. Also, test scripts S2 and S4 have object Obj8 in common, and test scripts S3 and S4 share object Obj5.

Figure 3:
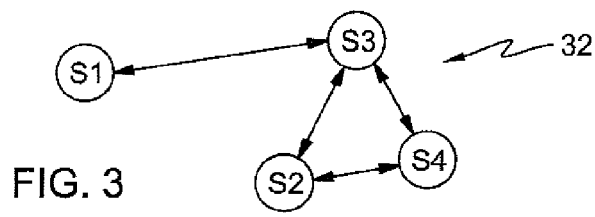
FIG. 3 is a failure dependency graph based on the shared objects between the scripts.

This relationship between the scripts is captured in the form of a graph, shown at 32, in FIG. 3, which represents a failure dependency between the scripts. In this graph, each script is represented as a node, and the edges between nodes indicate that the linked scripts have at least one object in common. For example, scripts S1 and S3 are linked because they share object Obj2, and script S2 and S4 are linked because they share object Obj8. Script S3 is linked to S2 because these two scripts share object Obj1, and scripts S3 and S4 are linked because they share object Obj5.

In one embodiment, such as implementation, any failure in a particular script could indicate that any related scripts that share the objects could also fail since they use shared functionality. This graph or FDG 32 is traversed to improve test coverage by expanding the list of test cases executed by adding the test scripts that are related to the failed scripts. This can improve early detection of defects based on a dynamic coverage mechanism. The test suite acts as a seed, based on which the dynamic coverage is achieved.

Figure 4:
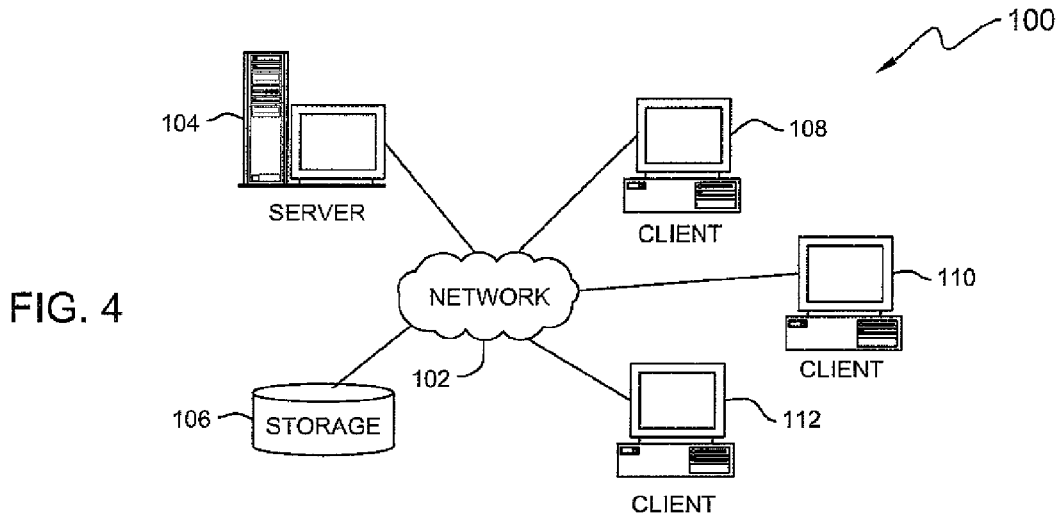
FIG. 4 depicts a representation of a network of data processing systems in which the present invention may be implemented.

FIG. 4 depicts a pictorial representation of a network of data processing systems in which the present invention may be practiced. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. These files are stored by the server in a filesystem. The clients also store files in a filesystem. These file systems may include, for example, a Windows NT™ filesystem (NTFS), a Windows™ based filesystem such as FAT32, an AIX™ file system, a UNIX™ file system such as System V Release 4 (SVR4), and a LINUX™ file system.

Network data processing system 100 may include additional servers, clients, and other devices not shown. In the depicted example, network data processing system 100 is the Internet, with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, comprised of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 5:
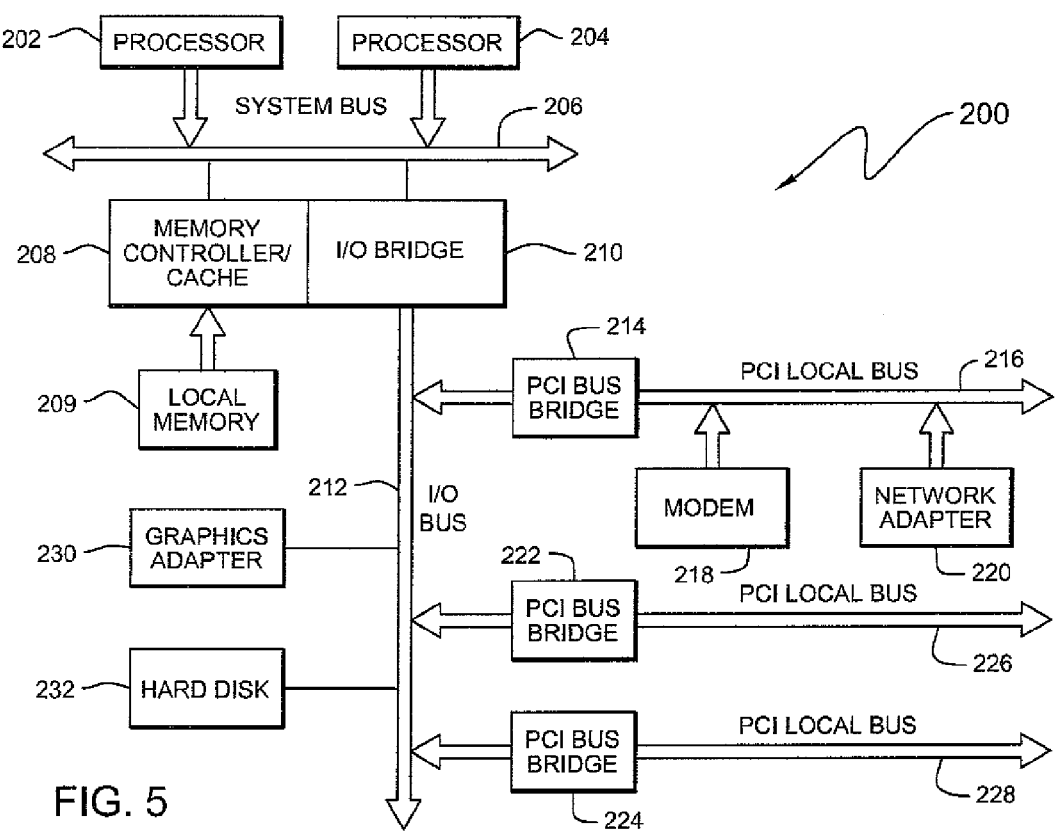
FIG. 5 is a block diagram of a data processing system that may be implemented as a server of the network of FIG. 1.

Referring to FIG. 5, a block diagram of a data processing system that may be implemented as a server, such as server 104 in FIG. 4, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O Bus Bridge 210 is connected to system bus 206 and provides an interface to I/O bus 212. Memory controller/cache 208 and I/O Bus Bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 4 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 5 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 5 may be, for example, an IBM eServer pSeries system, iSeries system, a product of International Business Machines Corporation in Armonk, N.Y., running the Advanced Interactive Executive (AIX) operating system or LINUX operating system.

Figure 6:
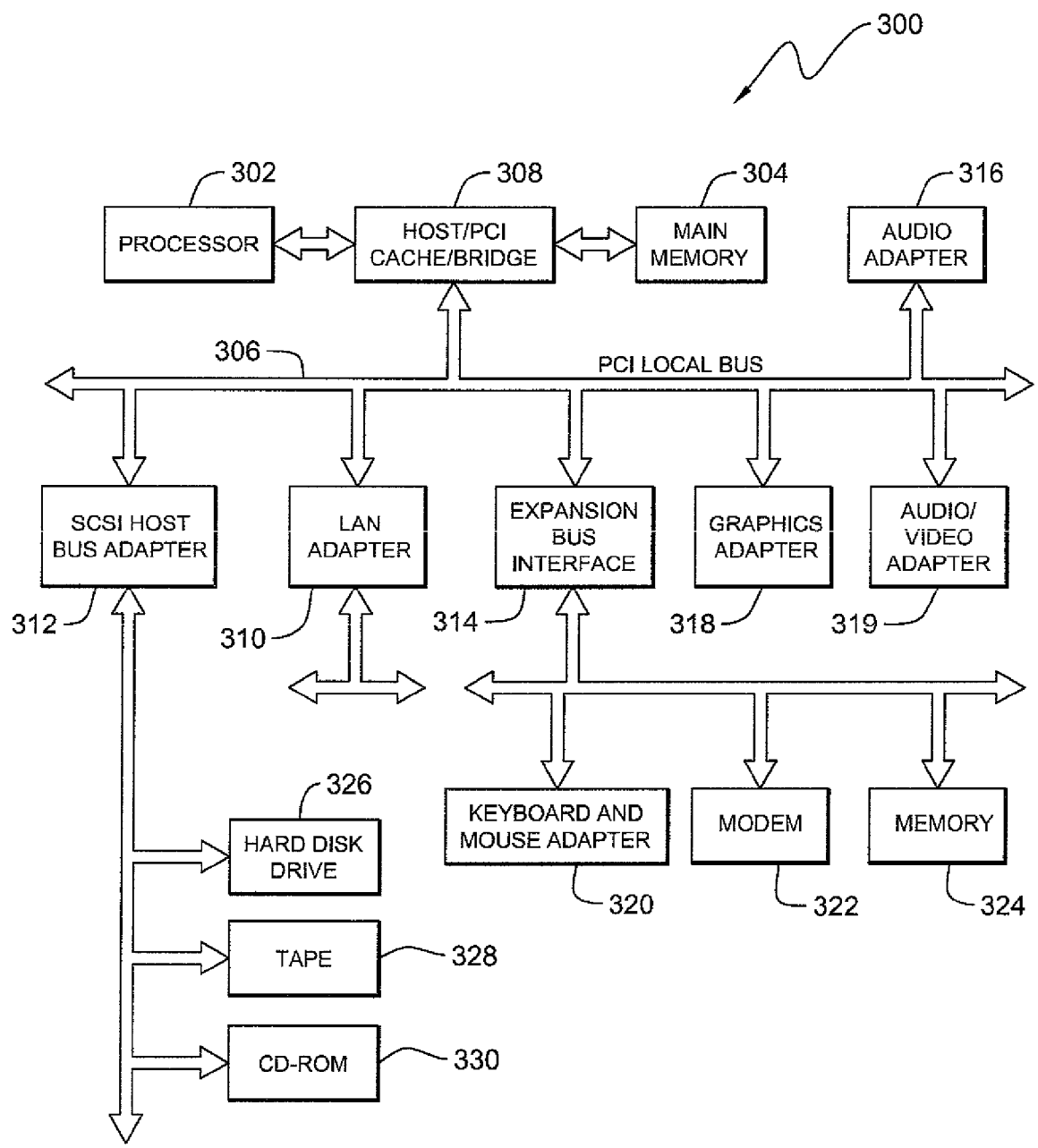
FIG. 6 is a block diagram illustrating a data processing system that may be implemented as a client of the network of FIG. 1.

With reference now to FIG. 6, a block diagram illustrating a data processing system is depicted that may be implemented as a client computer in FIG. 4. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI Bridge 308. PCI Bridge 308 also may include an integrated memory controller and cache memory for processor 302. Additional connections to PCI local bus 306 may be made through direct component interconnection or through add-in boards.

In the depicted example, local area network (LAN) adapter 310, small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 6. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented programming system, and applications or programs are located on storage devices, such as hard disk drive 326, and may be loaded into main memory 304 for execution by processor 302.

Those of ordinary skill in the art will appreciate that the hardware in FIG. 6 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 6 and above-described examples are not meant to imply architectural limitations. For example, data processing system 300 also may be a notebook computer or hand held computer in addition to taking the form of a PDA or a mobile phone. Data processing system 300 also may be a kiosk or a Web appliance.

As will be readily apparent to those skilled in the art, the present invention, or aspects of the invention, can be realized in hardware, software, or a combination of hardware and software. Any kind of computer/server system(s)—or other apparatus adapted for carrying out methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention, or aspects of the invention, can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of providing test coverage for detecting failures in a software application, the method comprising the steps of:
    identifying a set of test cases;
    for each of at least a subset of said test cases, identifying one or more of the other test cases that depend on said each of the test cases based on a defined functional relationship, including recording each test case in the form of a shared object map;
    using a selected one of said subset of test cases to test the software application; and
    when said test of the software application fails, then testing the software application with the one or more of the other test cases that depends on said selected one of the test cases based on said functional relationship, including using said shared object map to identify said one or more of the other test cases.

2. A method according to claim 1, wherein the step of identifying one or more of the other test cases that depends on said each of said subset of the test cases includes the step of, for each of the at least one of the subset of test cases, building a dependency graph, starting from said at least one of the test cases, based on said functional relationship, and wherein each of said one or more of the other test cases forms a respective one node on said dependency graph.

3. A method according to claim 2, wherein the step of testing the software application includes the step of traversing the dependency graph that starts from the selected test case to identify said one or more other test cases that depend from said selected test case.

4. A method according to claim 3, wherein the step of testing said software application further includes the step of testing the software application with all of the test cases on the dependency graph that starts from the selected test case.

5. A method according to claim 1, wherein:
    each of the set of test cases is associated with one or more objects; and
    said defined functional relationship is based on said objects.

6. A method according to claim 5, wherein:
    the test cases share the objects; and
    identifying one or more of the other test cases that share objects with said each test case.

7. A method according to claim 6, further includes the step of extracting dependencies among the test cases from said objects.

8. A method according to claim 1, wherein the step of identifying one or more of the other test cases includes the step of mining information about functional relationships between the set of test cases to extract said defined relationship.

9. A method of providing test coverage for detecting failures in a software application, the method comprising the steps of:
    identifying a set of test cases;
    for each of at least a subset of said test cases, identifying one or more of the other test cases that depend on said each of the test cases based on a defined functional relationship;
    using a selected one of said subset of test cases to test the software application; and
    when said test of the software application fails, then testing the software application with the one or more of the other test cases that depends on said selected one of the test cases based on said functional relationship; and wherein
    the step of identifying one or more of the other test cases includes the step of mining information about functional relationships between the set of test cases to extract said defined relationship; and
    the mining step includes the step of recording each test case in the form of a script and a shared object map.

10. A method according to claim 9, wherein failures of test cases lead to dynamic coverage of additional cases that are related to the failed test case based on functional and failure dependencies among the test cases.

11. A system for providing test coverage for detecting failures in a software application, the system comprising:
    one or more processing units configured for:
    identifying, for each of at least a subset of test cases formed from a set of test cases, one or more of the other test cases that depend on said each of the test cases based on a defined functional relationship, including recording each test case in the form of a shared object map;
    using a selected one of said subset of test cases to test the software application; and
    when said test of the software application fails, then testing the software application with the one or more of the other test cases that depend on said selected one of the test cases based on said functional relationship, including using said shared object map to identify said one or more of the other test cases.

12. A system according to claim 11, wherein the one or more of the processing units are further configured for building a dependency graph for each of the at least one of the subset of test cases, and starting from said at least one of the test cases, based on said functional relationship, and wherein each of said one or more of the other test cases forms a respective one node on said dependency graph.

13. A system according to claim 12, wherein the one or more processing units are configured for traversing the dependency graph that starts from the selected test case to identify said one or more other test cases that depend from said selected test case.

14. A system according to claim 11, wherein:
  each of the set of test cases is associated with one or more objects;
  the test cases share the objects; and
  said defined functional relationship is based on which of the other test cases share objects with said each test case.

15. A system according to claim 14, wherein failures of test cases lead to dynamic coverage of additional cases that are related to the failed test case based on functional and failure dependencies among the test cases.

16. A computer readable storage media, tangibly embodying a program of instructions executable by the computer to perform method steps for providing test coverage for detecting failures in a software application, said method steps comprising:
  for each of at least a subset of test cases formed from a set of test cases, identifying one or more of the other test cases that depend on said each of the test cases based on a defined functional relationship, including recording each test case in the form of a shared object map;
  using a selected one of said subset of test cases to test the software application; and
  when said test of the software application fails, then testing the software application with the one or more of the other test cases that depend on said selected one of the test cases based on said functional relationship, including using said shared object map to identify said one or more of the other test cases.

17. A computer readable storage media according to claim 16, wherein the step of identifying one or more of the other test cases includes the step of building a dependency graph for each of the at least one of the subset of test cases, starting from said at least one of the test cases, based on said functional relationship, and wherein each of said one or more of the other test cases forms a respective one node on said dependency graph.

18. A computer readable storage media according to claim 17, wherein the step of identifying said one or more of the other test cases includes the step of traversing the dependency graph that starts from the selected test case to identify said one or more other test cases that depend from said selected test case.

19. A computer readable storage media according to claim 16, wherein:
  each of the group of test cases is associated with one or more objects;
  the test cases share the objects; and
  said defined functional relationship is based on which of the other test cases share objects with said each test case.

20. A computer readable storage media according to claim 19, wherein failures of test cases lead to dynamic coverage of additional cases that are related to the failed test case based on functional and failure dependencies among the test cases.

\* \* \* \* \*